United States Patent
Domb

(10) Patent No.: US 8,829,865 B2
(45) Date of Patent: Sep. 9, 2014

(54) POWER FACTOR CORRECTION EFFICIENCY IMPROVEMENT CIRCUIT, A CONVERTER EMPLOYING THE CIRCUIT AND A METHOD OF MANUFACTURING A CONVERTER

(75) Inventor: Moshe Domb, Irvine, CA (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 13/176,022

(22) Filed: Jul. 5, 2011

(65) Prior Publication Data

US 2012/0014150 A1    Jan. 19, 2012

Related U.S. Application Data

(60) Provisional application No. 61/363,897, filed on Jul. 13, 2010.

(51) Int. Cl.
  *G05F 1/652*    (2006.01)
  *G05F 1/656*    (2006.01)
  *H02M 1/42*    (2007.01)
  *H02M 3/158*    (2006.01)

(52) U.S. Cl.
  CPC ............ *H02M 1/4208* (2013.01); *H02M 3/158* (2013.01); *Y02B 70/126* (2013.01)
  USPC ........... 323/222; 323/223; 323/224; 323/282; 323/284; 323/285; 323/286; 363/65

(58) Field of Classification Search
  USPC ............ 363/65; 323/222, 223, 224, 282, 284, 323/285, 286
  See application file for complete search history.

(56) References Cited

U.S. PATENT DOCUMENTS

| | | | |
|---|---|---|---|
| 7,561,446 B1 * | 7/2009 | Vinciarelli | 363/17 |
| 7,782,639 B2 * | 8/2010 | Vinciarelli | 363/65 |
| 7,920,391 B1 * | 4/2011 | Vinciarelli | 363/17 |
| 2006/0267561 A1 | 11/2006 | Domb et al. | |
| 2008/0123374 A1 * | 5/2008 | Vinciarelli | 363/65 |

* cited by examiner

*Primary Examiner* — Bao Q Vu
(74) *Attorney, Agent, or Firm* — General Electric Company

(57) ABSTRACT

The disclosure provides a power factor correcting (PFC) circuit, a power supply and a method of manufacturing a power converter. In one embodiment, the PFC circuit has a positive input terminal, an output terminal and a ground terminal and includes: (1) a power factor inductor coupled in series between the positive input terminal and the output terminal, (2) a main switch configured to periodically connect the power factor inductor to the ground terminal and (3) a clamping capacitor coupled to the power factor inductor and configured to provide zero turn-off loss for the main switch.

15 Claims, 6 Drawing Sheets

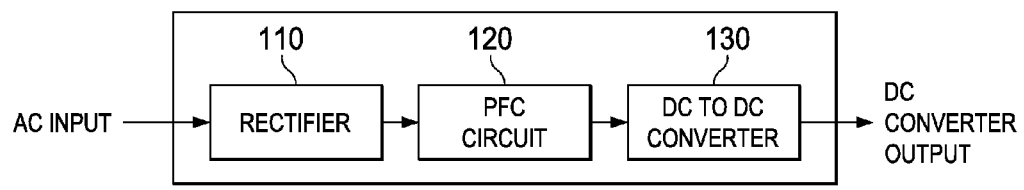
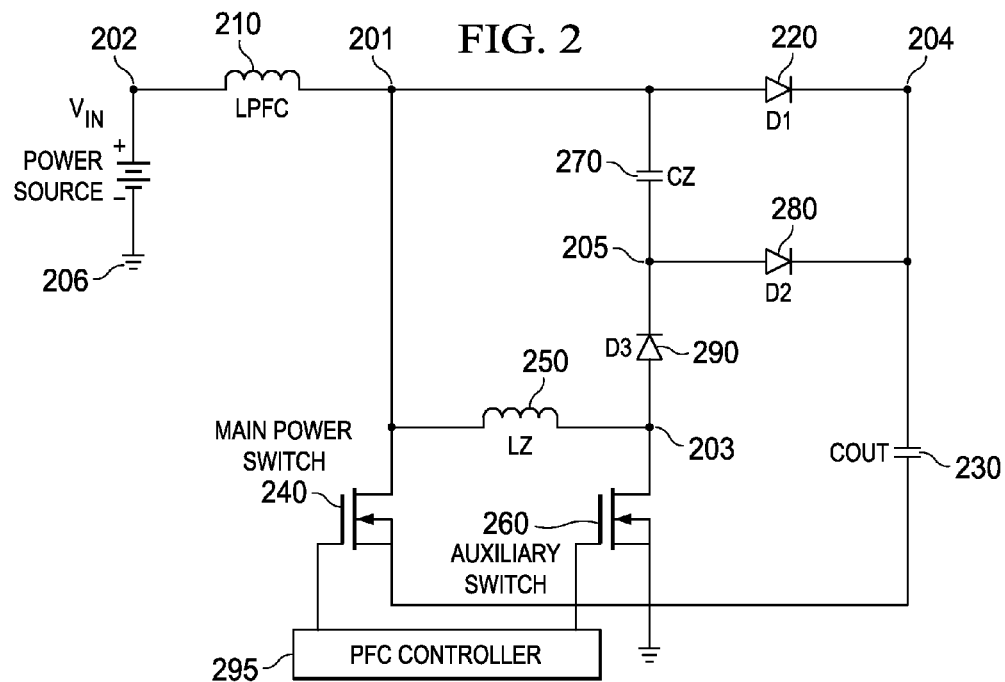

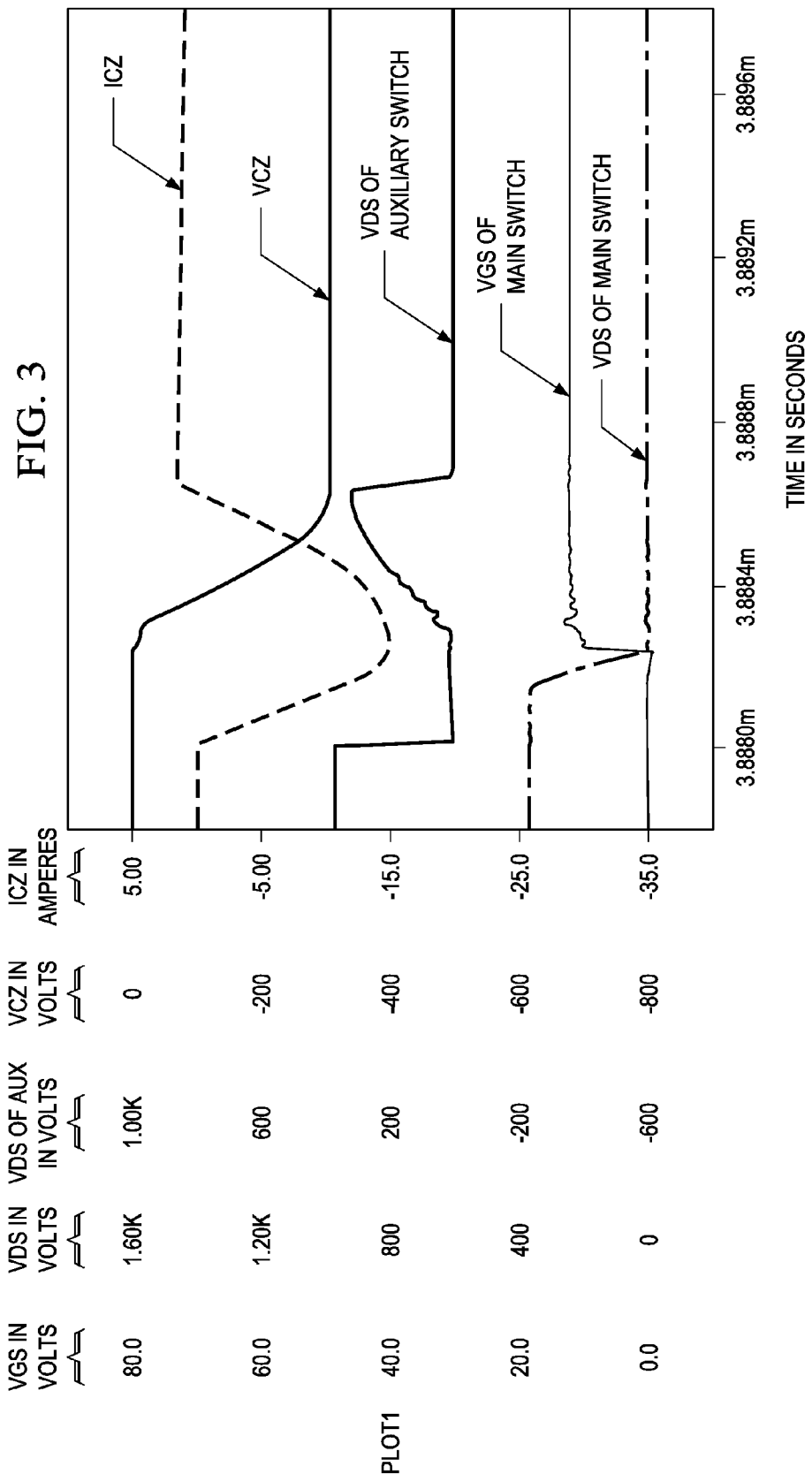

POWER FACTOR CORRECTION EFFICIENCY IMPROVEMENT CIRCUIT, A CONVERTER EMPLOYING THE CIRCUIT AND A METHOD OF MANUFACTURING A CONVERTER

CROSS-REFERENCE TO RELATED APPLICATION

This application claims the benefit of U.S. Provisional Application Ser. No. 61/363,897, filed on Jul. 13, 2010, entitled "POWER FACTOR CORRECTION EFFICIENCY IMPROVEMENT CIRCUIT," commonly assigned with this application and incorporated herein by reference.

TECHNICAL FIELD

This application is directed, in general, to AC to DC power conversion and, more specifically, to a power factor correction (PFC) circuit employed in AC to DC converters.

BACKGROUND

An AC to DC converter often includes an active PFC circuit to provide a DC voltage to the DC to DC Converter stage of an AC to DC converter and to condition the input current drawn from the AC input. Typically, an active PFC controls the input current drawn from the AC input so that the current waveform is proportional to and substantially in-phase with the AC input voltage waveform, typically a sine wave. The typical PFC circuit may include an input inductor often referred to as a PFC inductor, an output diode and an output capacitor. A main power switch is also included to regulate an output voltage that is provided across the output capacitor. The main power switch may regulate the output voltage by facilitating the discharge of energy from the input inductor, through the output diode and across the output capacitor.

SUMMARY

In one aspect, the disclosure provides a PFC circuit having a positive input terminal, an output terminal and a ground terminal. In one embodiment, the PFC circuit includes: (1) a power factor inductor coupled in series between the positive input terminal and the output terminal, (2) a main switch configured to periodically connect the power factor inductor to the ground terminal and (3) a clamping capacitor coupled to the power factor inductor and configured to provide zero turn-off loss for the main switch.

In another aspect, the disclosure provides a method of manufacturing a power converter. In one embodiment, the method includes: (1) connecting a power factor inductor to an output diode at a first node, (2) connecting a clamping capacitor to the power factor inductor and the output diode at the first node and (3) connecting a choke inductor together with a main power switch at the first node, wherein the power factor inductor is an input inductor for a PFC circuit including the main power switch and the output diode and the clamping diode limits turn-off voltage for the main power switch.

In yet another aspect, the disclosure provides a power supply having a positive input terminal, an output terminal and a ground terminal. In one embodiment, the power supply includes: (1) a power source configured to receive AC power and generate DC power therefrom, (2) a PFC circuit configured to receive and condition the DC power, the PFC circuit having (2A) a power factor inductor coupled to the power source at the positive input terminal and coupled in series between the positive input terminal and the output terminal, (2B) a main switch configured to periodically connect the power factor inductor to the ground terminal and (2C) a clamping capacitor coupled to the power factor inductor and configured to provide zero turn-off loss for the main switch.

BRIEF DESCRIPTION

Reference is now made to the following descriptions taken in conjunction with the accompanying drawings, in which:

FIG. 1 illustrates a block diagram of an embodiment of an AC to DC converter constructed according to the principles of the disclosure;

FIG. 2 illustrates a schematic diagram of an embodiment of a PFC circuit constructed according to the principles of the disclosure;

FIG. 3 is a graph illustrating the voltage and current characteristics versus time of selected components of the PFC circuit of FIG. 2 for the turn-on of the main switch of the PFC circuit;

DETAILED DESCRIPTION

Figure 4:
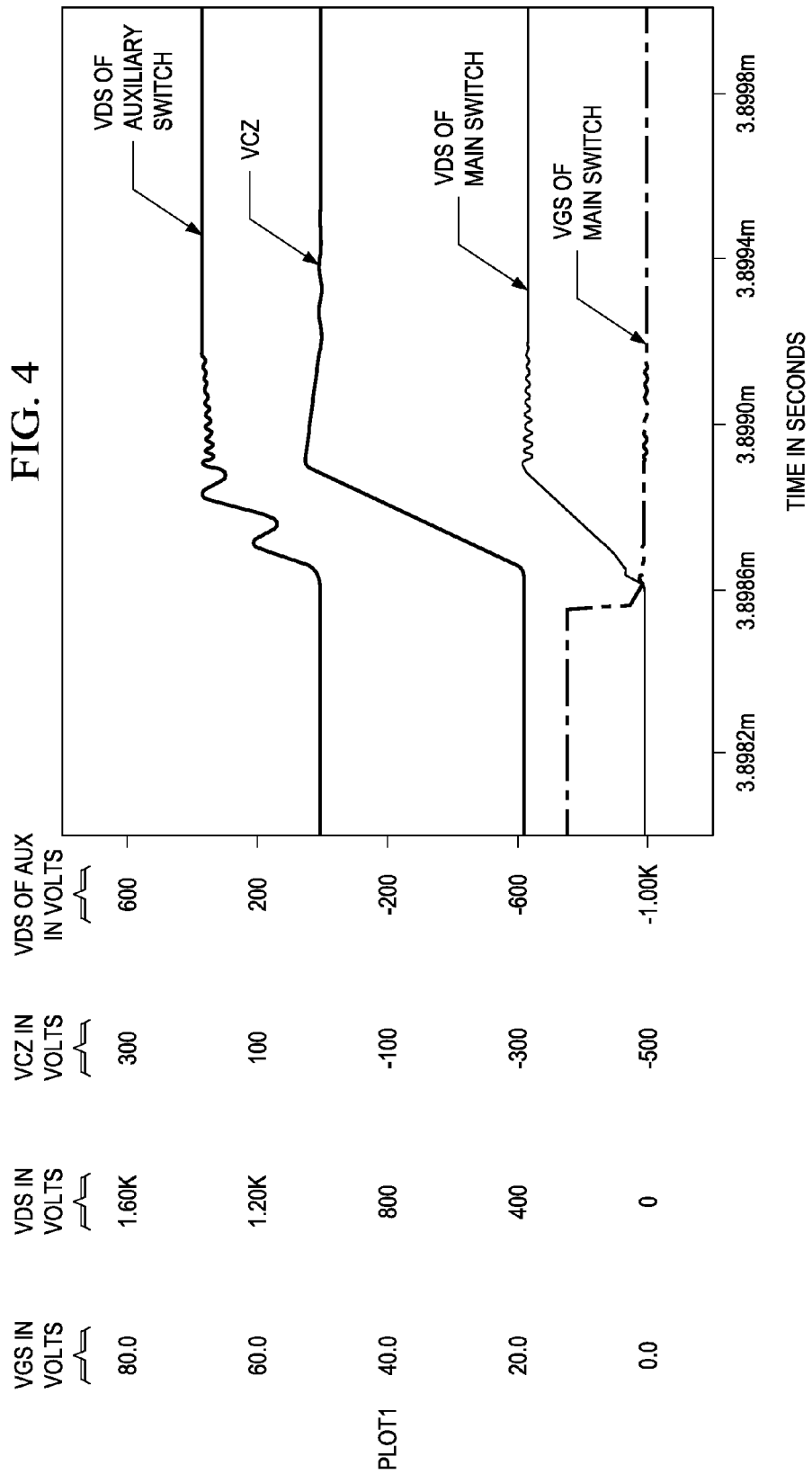
FIG. 4 is a graph illustrating the voltage and current characteristics versus time of selected components of the PFC circuit of FIG. 2 for the turn-off of the main switch of the PFC circuit.

The disclosure provides a PFC circuit with low or zero voltage switching (ZVS) on the main switch. Additionally, the disclosed PFC circuit has a zero turn off loss or at least approximately a zero turn off loss for the main switch. In addition to the main switch, the PFC circuit also includes an auxiliary switch that is used to drain the source capacitance of the main switch before being turned-on (i.e., ZVS). The disclosed PFC circuit is configured to also provide zero turn-off or approximate zero turn-off for the auxiliary switch. ZVS and zero turn-off as used herein include low or substantial ZVS and low or substantial zero turn-off.

The provided PFC circuit provides the ZVS and the zero turn-off described above, while also reducing the number of components employed compared to some conventional PFC circuits. For example, compared to the ZVS PFC circuit of U.S. patent application Ser. No. 11/139,162 which is included herein by reference, a reduction of multiple components is obtained while still providing ZVS and also providing zero turn-off for the main PFC circuit switch and the auxiliary switch. In addition to using fewer components, the provided PFC circuit can achieve faster switching frequency without switching loss penalty The configuration and component selections of the disclosed PFC circuit provide lower currents throughout the PFC circuit. As such, lower current Silicon Carbide (SiC) diodes can be used which further reduces cost. Efficiency can also be improved by the PFC circuit by using a lower Rdson of PFC without switching loss. Thus, the disclosure provides a PFC circuit with improved efficiency that includes a single snubber circuit for both ZVS and zero turn-off functionality.

FIG. 1 illustrates a block diagram of an embodiment of an AC to DC converter 100 constructed according to the principles of the disclosure. The converter 100 includes a rectifier 110, a PFC circuit 120 and a DC to DC converter 130. One skilled in the art will understand that the converter 100 may include other components that are not illustrated but are typically employed in conventional AC to DC converters.

The rectifier 110 is configured to receive an AC input and generate a DC output. The AC input may be from a conventional source such as a wall outlet. The rectifier 110 may be a conventional rectifier. In one embodiment, the rectifier 110 may be a full bridge rectifier. In another embodiment, the rectifier 110 may be a half-bridge rectifier.

The PFC circuit 120 is configured to receive and condition the DC output generated by the rectifier 110. In one embodiment, the PFC circuit 120 may boost the DC output from the rectifier 110. The PFC circuit 120 may be a single level circuit or may be a multi-level circuit. For example, in one embodiment, the PFC circuit 120 may be configured as the PFC circuit of FIG. 2. In another embodiment, the PFC circuit 120 may be configured as the PFC circuit of FIG. 5.

The PFC circuit 120 includes a main power switch and an auxiliary switch coupled across the main power switch and configured to provide ZVS for the main power switch. The PFC circuit 120 further includes a clamping capacitor that is configured to provide zero turn-off loss for the main switch. The type and size of the clamping capacitor is selected to provide the zero turn-off loss. For example, in some embodiments $$VCZ := ILZ \cdot \sqrt{\frac{LZ}{C_Z}}$$

is to be equal or greater than the bulk voltage of the PFC circuit 120, which may be 380 volts. Accordingly, typical values for the clamping capacitor CZ may be from 2200 picofarads to 0.022 microfarads.

The DC to DC converter 130 receives the conditioned DC output from the PFC circuit 120 and converts it to a different DC voltage to provide the DC converter output. The DC to DC converter 130 may be a conventional DC to DC converter. In one embodiment, the DC to DC converter 130 may be a resonant converter. For example, the DC to DC converter 130 may be an LLC converter. The DC to DC converter 130 may be a single stage or may be a multiple stage converter.

FIG. 2 illustrates a schematic diagram of an embodiment of a PFC circuit 200 constructed according to the principles of the disclosure. The PFC circuit 200 includes a positive input terminal 202, an output terminal 204 and a ground terminal 206. The PFC circuit 200 receives a DC input voltage from a power source across the positive input terminal 202 and the ground terminal 206. The PFC circuit 200 is configured to employ a main power switch 240 (Q) to boost the DC input voltage and generate a DC output voltage. The components and configuration of the PFC circuit 200 are selected to provide ZVS and zero turn-off for the main switch 240 and to also provide zero turn-off for an auxiliary switch 260 of the PFC circuit 200.

In addition to the above components, the PFC circuit 200 includes an input inductor 210 ($L_{PFC}$), an output diode 220 (D1) and an output capacitor 230 ($C_{OUT}$). The PFC circuit 200 also includes a choke inductor 250 (LZ), an auxiliary switch 260 ($Q_{AUX}$) a clamping capacitor 270 (CZ), a discharging diode 280 (D2) and a conducting diode 290 (D3). The PFC circuit 200 further includes a PFC controller 295 that is configured to generate control signals to activate (i.e., turn-on) and deactivate (i.e., turn-off) the main switch 240 and the auxiliary switch 260. Thus, the PFC controller 295 may include the functionality of a conventional controller for a PFC circuit and be configured to direct the operation of the main power switch 240 and the auxiliary switch 260 as described in connection with FIG. 3 and FIG. 4.

The power factor inductor 210 is coupled in series between the positive input terminal 202 and the output terminal 204. The main switch 240 is configured to periodically connect the power factor inductor to the ground terminal 206 via control signals from the PFC controller 295. The power factor inductor 210 and the main power switch 240 may be a conventional inductor and switch, respectively, that are typically employed in power factor correcting circuits.

The clamping capacitor 270 is connected to the power factor inductor 210 and is configured to provide zero turn-off loss for the main switch 240. That is, the clamping capacitor 270 is sized to provide zero turn-off for the main switch 240. The auxiliary switch 260 during turn-off will follow the main switch 240 during turn-off and will automatically have zero turn-off as well. The output diode 220 is connected in series between the power factor inductor 210 and the output terminal 204. The output diode 220 is connected to the power factor inductor 210 at a first node 201. The clamping capacitor 270 is also connected to the power factor inductor 210 and the output diode 220 at the first node 201.

The choke inductor 250 and the auxiliary switch 260 are coupled in series across the main switch 240 to discharge an internal capacitance (i.e., Coss) thereof prior to activating the main switch 240. The clamping capacitor 270 is connected to the power factor inductor 210, the choke inductor 250 and the main switch 240 at the first node 201. The conducting diode 290 is configured to conduct current through the choke inductor 250 when the auxiliary switch 260 is off. The conducting diode 290 is connected to the choke inductor 250 and the auxiliary switch 260 at a second node 203.

The discharge diode 280 is configured to allow energy stored in the choke inductor 250 to discharge to the output capacitor 230 that is coupled between the output terminal and ground when the auxiliary switch 260 is off. The discharge diode 280 is connected to the clamping capacitor 270 and the conducting diode 290 at a third node 205 of the PFC circuit 200.

The choke inductor 250, the auxiliary switch 260, the clamping capacitor 270, the discharging diode 280 and the conducting diode 290 may be collectively considered as the ZVS and the zero turn-off snubber circuit of the PFC circuit 200. The size of each component of the PFC circuit 200 may vary according to the various applications. For example, the input voltage and desired output voltage may be considered when determining the components for a particular application of the PFC circuit 200. To demonstrate the operation of the PFC circuit 200, Vin is at 130 volts and the desired output voltage is 380 volts. Five different modes of operation will be discussed with respect to the PFC circuit 200.

In a first mode, Mode 0, the main switch 240 is off, the auxiliary switch 260 is on and current through the choke inductor 250, $I_{LZ}$, is less than the input current through the power factor inductor 210, Iin, wherein Iin=$I_{LZ}$+$I_{D1}$ (the current through the output diode D1). In Mode 0, $I_{LZ}$ starts from zero and as long as $I_n$ is positive, the voltage at the anode of the output diode 220 is clamped to 380 volts (the output voltage) and the current $I_{LZ}$ is given by $I_{LZ}$=(380 v/LZ)t where t is time, 380 v is the booster output voltage 380 volts of the PFC circuit 200 and LZ is the inductance of the choking inductor 250. The current through the choking inductor 250, $I_{LZ}$, linearly increases with the output diode 220 conducting. As such, the choking inductor 250 is charged.

In a second mode, Mode 1, the auxiliary switch 260 is still on and the main switch 240 is turned-off. At this point, $I_{LZ}$ is greater than Iin and $I_{D1}$ is now zero. As such, Iin ILZ equals $I_{LZ}$ Iin plus the resonant current discharging through the main switch capacitance Coss, Ic. With both the main switch 240 off and the auxiliary switch 260 on, the internal capacitance of the main switch 240, Coss, discharges to zero with the energy stored in Coss transferred to $I_{LZ}$.

In the next mode, Mode 2, the main switch 240 remains turns on, the auxiliary switch is turned-off. From the previous OFF period, the voltage across the clamping capacitor 270 Vcz is zero volts. Accordingly, at the beginning of Mode 2 when the auxiliary switch 260 is turned-off (t=0), the auxiliary switch 260 has zero turn-off loss. For example, the Vds of the auxiliary switch 260 equals Vdsmain+Vcz. Since Vcz is 0v and Vdsmain is also 0v the Vdsaux is 0v as well.] The clamping capacitor 270, Cz, is now charged by the energy stored in the choke inductor 250 via $I_{LZ}$. With the main switch 240 still on, a resonance between the choke inductor 250 and the clamping capacitor 270 occurs that increases the voltage at the third node 205 in a sine wave fashion.

Mode 2 continues until the voltage Vcz across the clamping capacitor 270 equals 380 volts. In other words, when the third node 205 reaches 380 volts. At this point, Mode 3 occurs. In Mode 3, the main switch 240 remains on, the auxiliary switch 260 remains off, and Vcz equals the output voltage 380 volts. With the third node 205 at 380 volts, the diode 280 (D2), conducts since the anode is more positive than the cathode. In Mode 3, the voltage at the third node 205 is clamped to 380 volts due to diode 280, D2, conduction, and the energy stored in the choke inductor 250 is transferred to the output capacitor 230 through the conducting diode 290 and the diode 280.

In the next mode, Mode 4, the energy (e.g., all of the energy) in the choke inductor 250 has been transferred to the output capacitor 230. In Mode 4, the main switch 240 remains on, the auxiliary switch 260 remains off, Vdsaux, the drain source voltage of the auxiliary switch 260, discharges from 380 volts toward zero volts through Lz. Eventually the body diode of the auxiliary switch 260 conducts and maintains Vdsaux at 0v until the main switch 240 turns off. When turning-off, both the main switch 240 and the auxiliary switch 260 turn off from 0v, hence having zero turn off loss. Thus, the main switch 240 has both ZVS (zero voltage turn-on) and zero voltage turn-off. The auxiliary switch 260 has zero voltage turn off, but does not include ZVS.

The auxiliary switch 260, however, can be a much smaller FET compared to the main power switch 240 and have a larger rds on. Since the auxiliary switch 260 conducts for only 200 ns-300 ns, it's D-S capacitance can be very small. The turn on loss due to lack of ZVS, ½ C*380v^2*f, are very small.

In Modes 1-4, the main switch 240 is on and in Mode 0 the main switch 240 is off. The PFC circuit 200 is configured to provide zero turn-off for the main switch 240 when it is turned-off and the auxiliary switch 260 is off. From previous Ton period (i.e., main switch 240 is conducting), Vcz is charged to negative 380 volts. The voltage Vds across the drain-source of the main switch 240 is then equal to the negative 380 volts plus the output voltage 380 volts, or a total of zero volts. The main switch 240 is then turned-off at this time to provide a zero turn-off loss. With the main switch 240 and the auxiliary switch 260 both off, Iin flows through the power factor inductor 210, the clamping capacitor 270 and the discharging diode 280 to charge Vcz to one volt or approximately one volt due one diode drop of diode 280. Thereafter, the current Iin diverts to the output diode 220 and Vcz stays at one volt for the next turn on period Ton. The clamping capacitor 270 is charged until the voltage Vcz is positive, e.g., one volt. The amount of time that the discharging diode 280 conducts is equal to the amount of time that the clamping capacitor 270 charges from negative 380 volts to zero volts. Therefore, the discharging diode 280 can be a smaller diode than the output diode 220. For example, the discharging diode 280 may be rated at six to eight amps and the output diode 220 may be rated at ten amps. In addition to reducing the turn-off voltage for the main power switch 240, the value of the clamping capacitor 270 is also selected to provide a gradual slope of the drain-source voltage of the main switch 240. In the illustrated embodiment of FIG. 2, the clamping capacitor 270 may have a value of 4700 picofarads.

FIG. 3 is a graph 300 illustrating the voltage and current characteristics versus time of selected components of the PFC circuit of FIG. 2 for the turn-on of the main switch 240. The x-axis of the graph 300 is time in seconds with each division being 200 nanoseconds. The y-axis is in volt or amperes depending on the waveform. The scale for each particular waveform is given along the y-axis. The graph 300 includes the waveform of the gate-source voltage Vgs of the main switch 240 that represents the turn-on waveform of the main switch 240. The waveform of the drain-source voltage Vds of the main switch 240 is also included in the graph 300. Additionally, the graph 300 includes the drain-source voltage Vds of the auxiliary switch 260, the voltage Vcz across the clamping capacitor 270, and the current Ilz through the clamping capacitor 270. The waveforms of graph 300 reflect the above operating discussion of the PFC circuit 200 in FIG. 2 when the main switch 240 is turned-on.

FIG. 4 is a graph 400 illustrating the voltage and current characteristics versus time of selected components of the power factor correcting circuit of FIG. 2 for the turn-off of the main switch 240. The x-axis of the graph 400 is time in seconds with each division being 200 nanoseconds. The y-axis is in volts with the scale for each particular waveform given along the y-axis. The graph 400 includes the waveform of the gate-source voltage Vgs of the main switch 240 that represents the turn-off waveform for the main switch 240. The waveform of the drain-source voltage Vds of the main switch 240 is also included in the graph 300. Additionally, the graph 300 includes the drain-source voltage Vds of the auxiliary switch 260 and the voltage Vcz across the clamping capacitor 270. The waveforms of graph 400 reflect the above operating discussion of the PFC circuit 200 in FIG. 2 when the main switch 240 is turned-off. The PFC controller 295 provides the drive signals to turn-on and turn-off the main switch 240 and the auxiliary switch 260.

Figure 5:
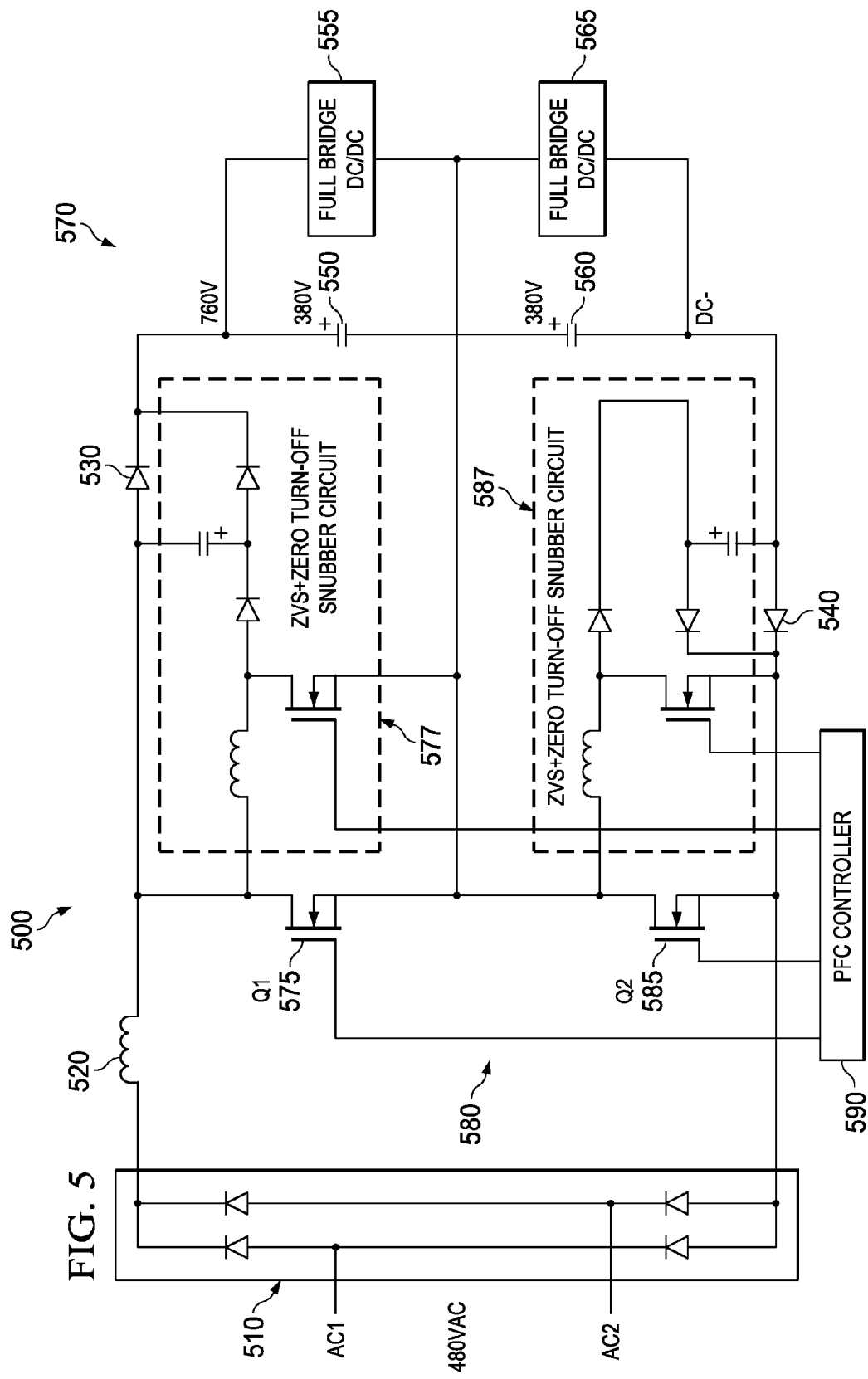
FIG. 5 illustrates a schematic diagram of another embodiment of an AC to DC converter constructed according to the principles of the disclosure.

FIG. 5 illustrates a schematic diagram of another embodiment of an AC to DC converter 500 constructed according to the principles of the disclosure. The converter 500 eliminates or substantially reduces turn-on and turn-off loss in a three level PFC circuit. The converter 500 includes two PFC circuits that share a power factor inductor (i.e., an input inductor for the power factor circuits). The converter 500 may be used with a high AC input, such as 480 vac, and may be employed in single phase or three phase applications. Additionally, as with the converter 100 and the PFC circuit 200, 600 volt semiconductors may be employed with the converter 500 for low conduction losses.

The converter 500 includes an AC source 510, a first PFC circuit 570 and a second PFC circuit 580. The first PFC circuit 570 includes a power factor inductor 520, a first output diode 530, a first output capacitor 550, a main power switch 575 and a snubber circuit 577. The second PFC circuit 580 includes a second output diode 540, a second output capacitor 560, a main power switch 585 and a snubber circuit 587. The first and second output capacitors 550, 560, are each coupled to a DC to DC bridge 555 and 565, respectively. As illustrated in FIG. 5, each DC to DC bridge may be a full bridge. In other embodiments, a half-bridge may be employed. In alternative embodiments, the converter 500 may not include the DC to DC bridges 555, 565.

Figure 6:
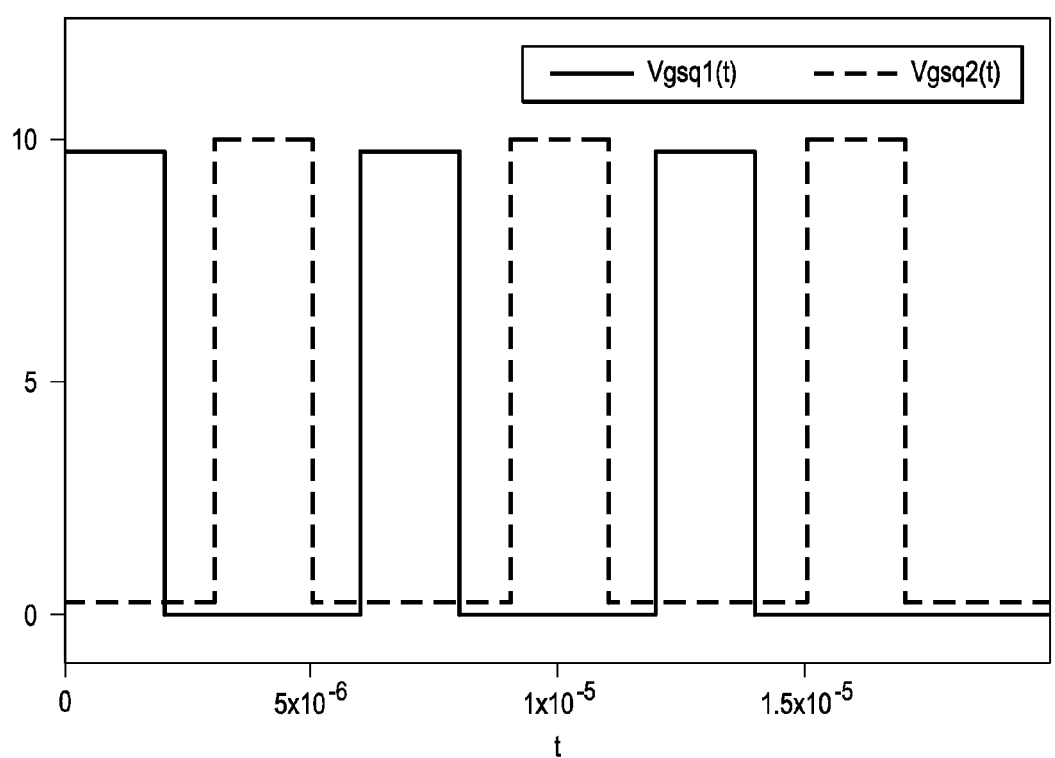
FIG. 6 illustrates a graph of an example of the drive signals for the main power switches of the first and second PFC circuits of the converter embodiment in FIG. 5.

The first and second PFC circuits 570, 580, are configured to operate similar to the PFC circuit 200 with both PFC circuit 570, 580, employing the power factor inductor 520 as an input inductor. A PFC controller 590 is coupled to the main power switches 575, 585, and configured to generate drive signals to periodically turn-on and turn-off these switches to generate an output voltage at the output capacitors 550, 560. The PFC controller 590 is configured to drive the main power switches 575, 585, in an interleaved fashion to generate the output voltage for the converter 500. In FIG. 5, an output voltage of 38 volts is generated across each of the output capacitors 550, 560, for a total of 760 volts generated by the converter 500. FIG. 6 illustrates a graph 600 of an example of the drive signals for the main power switches of the first and second PFC circuits 570, 580. The x-axis of the graph 600 is time and the y-axis is the gate-to-source voltage of the main power switches of each PFC circuit 570 and 580.

As illustrated, the power source 510 may be an AC to DC full bridge rectifier. In the illustrated embodiment of FIG. 5, the input voltage may be 480 vac with a cumulative output voltage of 760 volts across both output capacitors 550 and 560. The main switches for both PFC circuits 570, 580, and both output diodes 530, 540, may be 600 volt rated components. For example, the main power switches 575, 585, may be 600 volt rated FETs.

Figure 7:
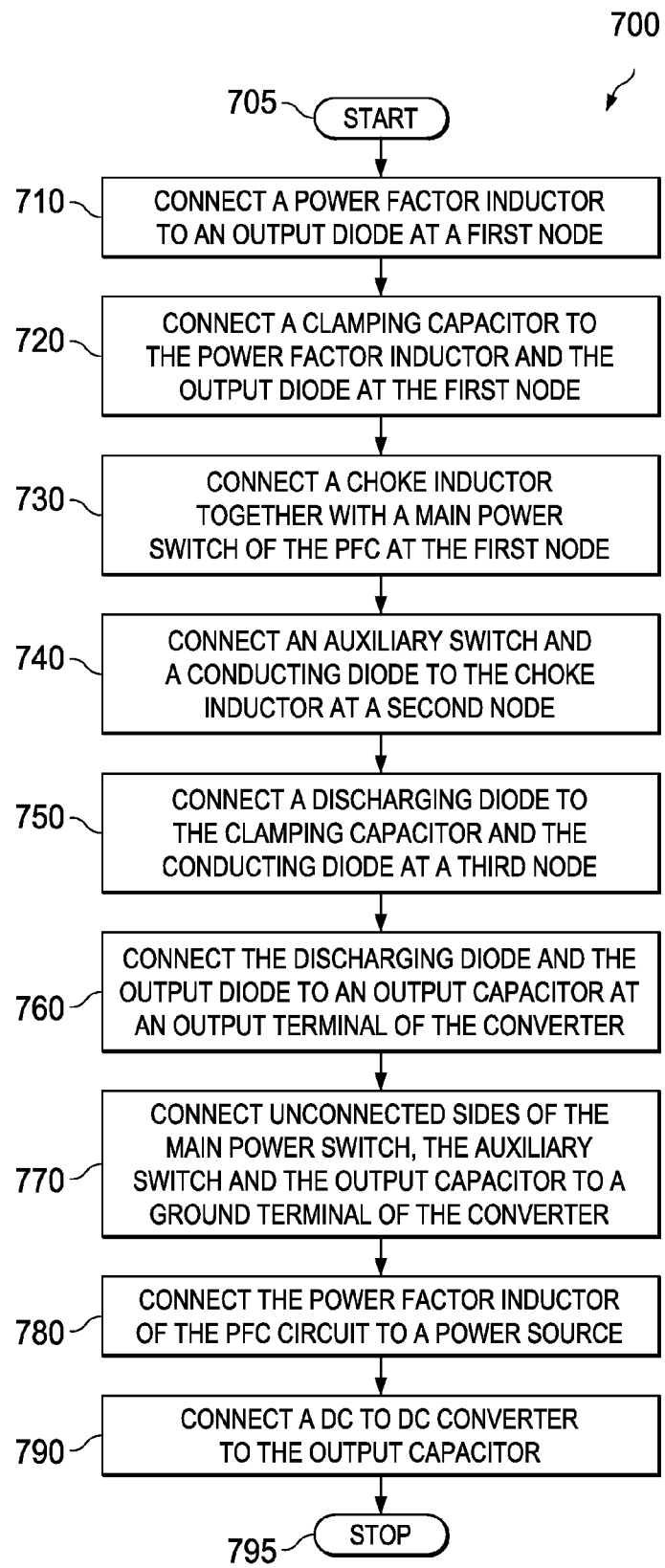
FIG. 7 illustrates a flow diagram of an embodiment of a manufacturing a PFC circuit carried out according to the principles of the disclosure.

FIG. 7 illustrates a flow diagram 700 of an embodiment of manufacturing a power converter carried out according to the principles of the disclosure. The power converter may be an AC to DC converter such as disclosed in FIG. 1. The manufactured power converter may include one or multiple of the PFC circuits such as illustrated in FIG. 2. Accordingly, in one embodiment the power converter manufactured may be the converter in FIG. 5. With multiple PFC circuits, some of the steps of method 700 may be repeated. The method 700 begins in a step 705.

In a step 710, a power factor inductor is connected to an output diode at a first node. The power factor inductor and the output diode, therefore, are connected in series between a positive input terminal and an output terminal of the power converter. The power factor inductor is an input inductor for a PFC circuit. The power factor inductor and the output diode are directly coupled together at the first node. As such, another component is not connected between the power factor inductor and the output diode.

A clamping capacitor is connected to the power factor inductor and the output diode at the first node in a step 720. In a step 730, a choke inductor and a main power switch of the PFC circuit are connected together at the first node. The main power switch, the choke inductor, the clamping capacitor, the output diode and the power factor inductor are directly coupled together at the first node. An auxiliary switch and a conducting diode are connected to the choke inductor at a second node in a step 740. The second node is a different node than the first node.

At yet a different node, a third node, a discharging diode is connected to the clamping capacitor and the conducting diode in a step 750. In a step 760, the discharging diode and the output diode are connected to an output capacitor at the output terminal. The unconnected sides of the main power switch, the auxiliary switch and the output capacitor are connected to a ground terminal of the converter in a step 770.

Steps 710 through 770 describe the manufacturing of a PFC circuit for the converter. In a step 780, the power factor inductor of the PFC circuit is connected to a power source. The power source may be an AC to DC bridge rectifier. A DC to DC converter is coupled to the output capacitor in a step 790. The DC to DC converter may be a full DC to DC bridge as illustrated in FIG. 5. The method 700 ends in a step 795.

Those skilled in the art to which this application relates will appreciate that other and further additions, deletions, substitutions and modifications may be made to the described embodiments.

What is claimed is:

1. A power factor correcting circuit having a positive input terminal, an output terminal and a ground terminal, comprising:
   a power factor inductor coupled in series between said positive input terminal and said output terminal, said power factor inductor comprising an output side coupled to a first node;
   a main switch configured to periodically connect said power factor inductor to said ground terminal;
   a snubber circuit coupled to said main switch, said snubber circuit comprising:
      a choke inductor and an auxiliary switch coupled in series across said main switch, said choke inductor and said auxiliary switch configured to provide zero voltage switching for said main switch;
      a clamping capacitor coupled to said power factor inductor at said first node, said clamping capacitor configured to provide zero turn-off loss for said main switch;
      a conducting diode coupled to said choke inductor and said auxiliary switch at a second node;
      a discharge diode coupled to said clamping capacitor and said conducting diode at a third node; and
   an output diode connected in series between said power factor inductor and said output terminal, wherein said output diode is connected to said power factor inductor and said output diode at said first node.

2. The power factor correcting circuit as recited in claim 1 wherein said choke inductor said auxiliary switch are configured to discharge an internal capacitance of said main switch prior to activating said main switch.

3. The power factor correcting circuit as recited in claim 1 wherein said clamping capacitor is connected to said power factor inductor, said choke inductor and said main switch at said first node.

4. The power factor correcting circuit as recited in claim 3 wherein said conducting diode is configured to conduct current through said choke inductor when said auxiliary switch is off.

5. The power factor correcting circuit as recited in claim 4 wherein said discharge diode is configured to allow said choke inductor to discharge energy to an output capacitor coupled to said output terminal.

6. A method of manufacturing a power factor correcting circuit for a power converter, comprising:
   connecting a power factor inductor to an output diode at a first node;
   coupling a main power switch at said first node, said main power switch configured to periodically connect said power factor inductor to a ground terminal;
   coupling a snubber circuit to said main switch, wherein coupling the snubber circuit to said main switch comprises:

coupling a choke inductor and an auxiliary switch in series across said main switch, said choke inductor and said auxiliary switch configured to provide zero voltage switching for said main switch;

connecting a clamping capacitor to said power factor inductor and said output diode at said first node, said clamping capacitor configured to provide zero turn-off loss for said main switch;

coupling a conducting diode coupled to said choke inductor and said auxiliary switch at a second node; and coupling a discharge diode coupled to said clamping capacitor and said conducting diode at a third node.

7. The method as recited in claim 6 further comprising connecting said discharging diode and said output diode to an output capacitor at an output terminal of said converter.

8. The method as recited in claim 7 further comprising connecting unconnected sides of the main power switch, the auxiliary switch and the output capacitor to a ground terminal of the converter.

9. The method as recited in claim 8 further comprising connecting said power factor inductor of said PFC circuit to a power source.

10. The method as recited in claim 9 further comprising connecting a dc to dc converter to said output capacitor.

11. A power supply having a positive input terminal, an output terminal and a ground terminal, comprising:
a power source configured to receive AC power and generate DC power therefrom; and
a power factor correcting circuit configured to receive and condition said DC power, said power factor correcting circuit including:
a power factor inductor coupled to said power source at said positive input terminal and coupled in series between said positive input terminal and said output terminal, said power factor inductor comprising an output side coupled at a first node;
a main switch configured to periodically connect said power factor inductor to said ground terminal;
a snubber circuit coupled to said main switch, said snubber circuit comprising:
a choke inductor and an auxiliary switch coupled in series across said main switch, said choke inductor and said auxiliary switch configured to provide zero voltage switching for said main switch;
a clamping capacitor coupled to said power factor inductor at said first node, said clamping capacitor configured to provide zero turn-off loss for said main switch;
a conducting diode coupled to said choke inductor and said auxiliary switch at a second node;
a discharge diode coupled to said clamping capacitor and said conducting diode at a third node; and
an output diode connected in series between said power factor inductor and said output terminal, wherein said output diode is connected to said power factor inductor and said output diode at said first node.

12. The power supply as recited in claim 11 wherein said choke inductor said auxiliary switch are configured to discharge an internal capacitance of said main switch prior to activating said main switch.

13. The power supply as recited in claim 11 wherein said power factor correcting circuit is a first power factor correcting circuit and said power supply further comprises a second power factor correcting circuit coupled to said first power factor correcting circuit.

14. The power supply as recited in claim 13 wherein said first and said second power factor correcting circuits are coupled to said power factor inductor.

15. The power supply as recited in claim 14 wherein said first and said second power factor correcting circuits include zero voltage switching and zero turn-off snubber circuits.

* * * * *

UNITED STATES PATENT AND TRADEMARK OFFICE
CERTIFICATE OF CORRECTION

| | | |
|---|---|---|
| PATENT NO. | : 8,829,865 B2 | Page 1 of 1 |
| APPLICATION NO. | : 13/176022 | |
| DATED | : September 9, 2014 | |
| INVENTOR(S) | : Domb | |

It is certified that error appears in the above-identified patent and that said Letters Patent is hereby corrected as shown below:

IN THE SPECIFICATION

In Column 4, Line 62, delete "$I_n$" and insert -- $I_{D1}$ --, therefor.

Signed and Sealed this
Twenty-seventh Day of October, 2015

Michelle K. Lee
*Director of the United States Patent and Trademark Office*